(12) United States Patent
Vacchi et al.

(10) Patent No.: US 12,175,213 B2
(45) Date of Patent: Dec. 24, 2024

(54) MAPPING DATA MODELS TO FACILITATE CODE GENERATION

(71) Applicant: Red Hat, Inc., Raleigh, NC (US)

(72) Inventors: Edoardo Vacchi, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 205 days.

(21) Appl. No.: 17/824,002

(22) Filed: May 25, 2022

(65) Prior Publication Data

US 2023/0385036 A1 Nov. 30, 2023

(51) Int. Cl.
*G06F 8/35* (2018.01)

(52) U.S. Cl.
CPC ........................... *G06F 8/35* (2013.01)

(58) Field of Classification Search
CPC ........................................................ G06F 8/35
See application file for complete search history.

(56) References Cited

U.S. PATENT DOCUMENTS

| | | | |
|---|---|---|---|
| 7,873,663 B2 | 1/2011 | Willis et al. | |
| 7,954,051 B2 | 5/2011 | Achilles et al. | |
| 8,566,804 B1* | 10/2013 | Carrick | G06F 8/35 703/22 |
| 8,990,783 B1* | 3/2015 | Yu | G06F 8/35 703/22 |
| 9,508,052 B1* | 11/2016 | Badawy | G06Q 10/103 |
| 9,612,806 B2* | 4/2017 | Conrad | G06F 8/35 |
| 9,870,203 B2 | 1/2018 | Hermanns et al. | |
| 2008/0082959 A1* | 4/2008 | Fowler | G06F 8/35 717/104 |
| 2011/0088011 A1 | 4/2011 | Ouali | |
| 2015/0095877 A1* | 4/2015 | Lin | G06F 8/35 717/106 |
| 2015/0331979 A1* | 11/2015 | Englehart | G06F 8/35 703/2 |
| 2016/0306790 A1* | 10/2016 | Mos | G06F 16/367 |

(Continued)

FOREIGN PATENT DOCUMENTS

WO 2014018641 A2 1/2014

OTHER PUBLICATIONS

Mos et al; Improving Process Robustness through Domain-Specific Model Transformations; 6pages (Year: 2013).*

(Continued)

*Primary Examiner* — Wei Y Zhen
*Assistant Examiner* — Brahim Bourzik
(74) *Attorney, Agent, or Firm* — Dority & Manning, P.A.

(57) ABSTRACT

In various examples disclosed herein, provided is a method for mapping data models to facilitate code generation. The method can include receiving a first file comprising a first data model of a first group of components and a second file comprising a second data model of a second group of components. The method can also include converting the first data model into a first intermediate data model. The method can also include converting the second data model into a second intermediate data model. The method can also include mapping the first intermediate data model to the second intermediate data model to generate a map of matching elements. The method can also include generating code to be executed based at least in part on the map of matching elements.

18 Claims, 7 Drawing Sheets

(56) References Cited

U.S. PATENT DOCUMENTS

2019/0122119 A1\* 4/2019 Husain .................. G06N 3/086
2021/0200755 A1\* 7/2021 Curtis .................... G06F 16/25
2022/0050584 A1\* 2/2022 Dines ....................... G06F 8/34

OTHER PUBLICATIONS

Boyd, M. et al., "Comparing and Transforming Between Data Models via an Intermediate Hypergraph Data Model," Journal on Data Semantics IV, Jan. 2005, 42 pages.
Guo, Z. et al., "A Compiler Intermediate Representation for Reconfigurable Fabrics," International Journal of Parallel Programming, vol. 36, Sep. 2008, Springer, pp. 493-520.
Lämmel, R. et al., "Mappings make data processing go round: An inter-paradigmatic mapping tutorial," Lecture Notes in Computer Science, vol. 4143, Jan. 2006, 52 pages.

\* cited by examiner

MAPPING DATA MODELS TO FACILITATE CODE GENERATION

BACKGROUND

Business automation is a technological area of growing interest and importance that facilitates the implementation of a business application on a computing system via a standardized notation system.

SUMMARY

In various examples disclosed herein, provided is a method and system for mapping data models associated with business process automation files associated with different business process modeling and notation syntaxes to facilitate the interoperability of the files. The files, or business assets, can include representations of tasks that are organized differently and differ in format and semantics. Each of the files can comprise one or more data models which are abstract models that organize elements of data and standardize how they relate to one another. The system can convert each of the disparate data models into intermediate data models and then provide a mapping between elements in the respective intermediate data models. The mapping can then improve the interoperability of the files in a business process automation platform that calls on various components of the files.

In an example, a method includes receiving, by a computing system comprising one or more processor devices of one or more computing devices, a first file comprising a first data model of a first group of components in a first notation syntax and a second file comprising a second data model of a second group of components in a second notation syntax. The method also includes converting the first data model of the first group of components into a first intermediate data model. The method also includes converting the second data model of the second group of components into a second intermediate data model. The method also includes mapping the first intermediate data model to the second intermediate data model to generate a map of matching elements in the first intermediate data model and the second intermediate data model. The method also includes generating code to be executed based at least in part on the map of matching elements, wherein the code comprises a reference of a first component in the first group of components to a second component in the second group of components.

In an example, a computing system includes one or more computing devices, the one or more computing devices comprising one or more processor devices, the one or more processor devices to receive a first file comprising a first data model of a first group of components in a first notation syntax and a second file comprising a second data model of a second group of components in a second notation syntax. The processor devices also convert the first data model of the first group of components into a first intermediate data model. The processor devices also convert the second data model of the second group of components into a second intermediate data model. The processor devices also map the first intermediate data model to the second intermediate data model to generate a map of matching elements in the first intermediate data model and the second intermediate data model. The processor devices also generate code to be executed based at least in part on the map of matching elements, wherein the code comprises a reference of a first component in the first group of components to a second component in the second group of components.

In an example, a non-transitory computer-readable storage medium includes executable instructions to cause one or more processor devices of one or more computing devices to receive a first file comprising a first data model of a first group of components in a first notation syntax and a second file comprising a second data model of a second group of components in a second notation syntax. The instructions further cause the one or more processor devices to convert the first data model of the first group of components into a first intermediate data model. The instructions further cause the one or more processor devices to convert the second data model of the second group of components into a second intermediate data model. The instructions further cause the one or more processor devices to map the first intermediate data model to the second intermediate data model to generate a map of matching elements in the first intermediate data model and the second intermediate data model. The instructions further cause the one or more processor devices to generate code to be executed based at least in part on the map of matching elements, wherein the code comprises a reference of a first component in the first group of components to a second component in the second group of components.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but, unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

The term "business automation" as used herein refers to the use of predetermined modeling and notation systems that facilitate the modeling of business processes and/or decision services for visualization purposes, and also facilitate the implementation of such business processes and decision services through software instructions that, when interpreted, or compiled and executed, implement a desired business system on one or more computing devices.

Business process modeling is the activity of representing the processes of an enterprise, where the processes can be a series of tasks, events, conditions, and other activities that are recorded and tracked in a manner that can enable analysts to better understand the systems and operations of the enterprise. There are many different methodologies and notation systems that can be used to track, model, and simulate the processes, and, in a cloud-oriented business process automation platform, these can lead to a large set of heterogenous source files that are not necessarily interoperable. Even files that use the same methodology or notation system may not be interoperable since the files may contain references to different files that are not compatible.

During business process modeling, the operational specifications of business processes can be captured, and the data of business processes, known as "artifacts," can be described by characterizing business-relevant data objects, their lifecycles, and related services. Business process modeling tools provide business users with the ability to model their business processes, implement and execute those models, and refine the models based on as-executed data. As a result, business process modeling tools can provide transparency into business processes, as well as the centralization of corporate business process models and execution metrics. The business process modeling tools can also enable simulation functionality that allows for pre-execution modeling and simulation to explore "what-if" scenarios with different inputs. Once the modeling and simulation is performed, the files comprising the processes can be utilized at run-time or when performing business process automation.

Examples of such modeling and notation systems include, by way of non-limiting example, Business Process and Model Notation (BPMN), available at www.omg.org, Decision Model and Notation (DMN), available at www.omg.org, Predictive Model Markup Language (PMML), available at www.dmg.org, and Drools Rules Language (DRL), available at www.drools.org. Generally, a file utilizing a modeling and notation system will be referred to herein collectively as a business asset. Each business asset may comprise an individual file that describes and contains software instructions to implement one or more components, such as processes or decision services, and instructions suitable for visualizing in a user interface the one or more components that are implemented by the business asset. Together, a related collection of business assets implement a particular business application that can execute on one or more computing systems to provide desired functionality.

In various examples disclosed herein, provided is a method and system for mapping data models associated with business process automation files associated with different business process modeling and notation syntaxes to facilitate the interoperability of the files. The files, or business assets, can include representations of tasks that are organized differently and differ in format and semantics. Each of the files can comprise one or more data models which are abstract models that organize elements of data and standardize how they relate to one another. The system can convert each of the disparate data models into intermediate data models and then provide a mapping between elements in the respective intermediate data models. The mapping can then improve the interoperability of the files in a business process automation platform that calls on various components of the files.

In an example, if the system is unable to determine that elements from the disparate data models match, the system can identify potential matches and provide the potential, or suggested matches to a display device which can display suggested pairings and, based on feedback received from the user, update the mapping between the intermediate data models.

Figure 1:
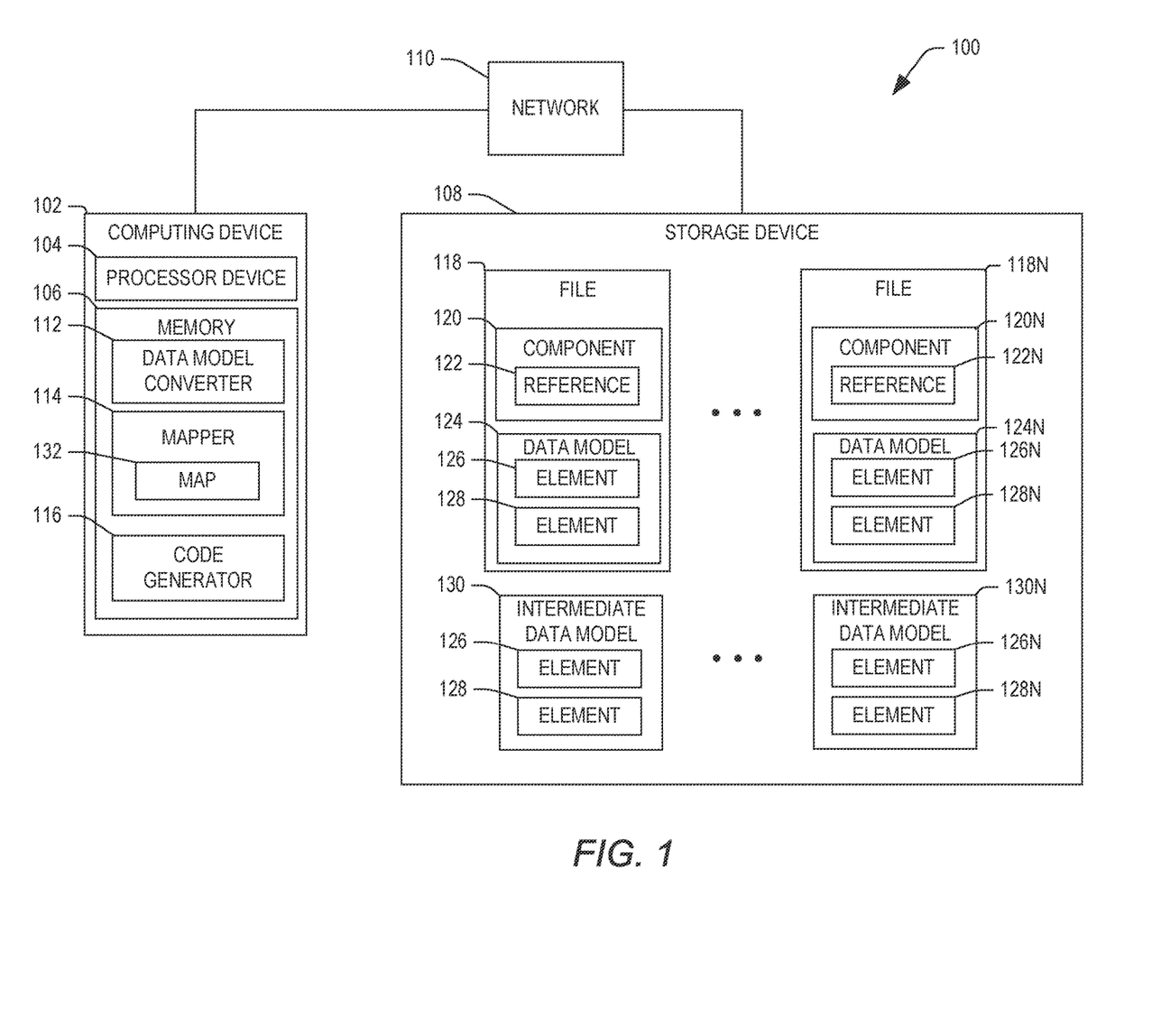
FIG. 1 illustrates a block diagram of an example computing system for mapping data models to facilitate code generation in accordance with various aspects of the subject disclosure.

Turning now to FIG. 1, illustrated is a block diagram of an example computing system 100 for mapping data models to facilitate code generation. The computing system 100 includes a computing device 102, which in turn includes a processor device 104 and a memory 106. The computing device 102 may include, or be communicatively coupled to, a storage device 108. In some examples, the computing device 102 may access the storage device 108 via a network 110. The memory 106 can include a data model converter 112, a mapper 114, and a code generator 116.

The storage device 108 can include files 118-118N that each comprise information associated with components 120-120N that may each include references 122-122N to other components in other files 118-118N. The files 118-118N can also include data models 124-124N that include elements 126-126N and 128-128N. The storage device 108 can also include intermediate data models 130-130N that correspond to the data models 124-124N respectively. The intermediate data models 130-130N include the same elements 126-126N and 128-128N, but in a standardized format relative to the parent data models 124-124N.

The components can be decision services or processes or can represent any steps in a business process, including flow objects (e.g., events, activities, and gateways), connecting objects (e.g., sequence flow, message flow, and/or association, etc.), swim lanes, artifacts, decision steps, and other elements of a business process identified in the files 118-118N. It is to be appreciated that, although the files 118-118N are each depicted in FIG. 1 as including one component each, this is merely for the sake of simplicity and that the files 118-118N can contain any number of components. Likewise, the data models 124-124N and the intermediate data models 130-130N are depicted with two elements each, but in other examples, other numbers of elements are possible.

In an example, the files 118-118N can be in one or many different formats, using different modeling and/or notation systems. For example, the files 118-118N can include one or more of DMN files, BPMN files, PMML files, rules files written using DRL, or files using other formats or notation systems. The DMN files can facilitate automated decisioning; the BPMN files can be used to encode business processes; the PMML files can be used to describe predictive models; and the DRL files can comprise information related to a business rule management system.

In an example, the computing device 102 can receive, via the network 110 and from the storage device 108, the files 118-118N in order to perform the mapping of the data models 124-124N to facilitate generation of code to be executed at run-time by a business process automation platform. In an example, the files 118-118N can be of the same notation system, but contain information related to the disparate components 120-120N. In other examples, the files 118-118N can be associated with different notation systems (e.g., a DMN file and a BPMN file). The components 120-120N may use different semantics, different syntax, different names, and different signatures, even if referring to the same steps, resources, or events.

The data models 124-124N are abstract models that organize elements of data and standardize how they relate to one another. The structure and organization of each of the data models 124-124N can vary depending on the notation and syntax of the files 118-118N (e.g., BPMN syntax, DMN syntax, PMML syntax, DRL syntax, etc.), the types and number of components in each of the files 118-118N, and other factors. Due to the differences between the data models 124-124N, they are not interoperable with each other and may look or be structured differently, even if the elements 126-126N and 128-128N correlate with each other. In an example, each of the files 118-118N can include one or more data models each representing different groups of components within the files 118-118N.

To begin the process of mapping the data models, the data model converter 112 can convert each of the data models 124-124N into the intermediate data models 130-130N to standardize the representation of the elements 126-126N and 128-128N. In an example, the data model converter 112 can use a standardized template for converting the data models 124-124N into intermediate data models 130-130N. In an example, a developer of a runtime evaluation engine implementation (e.g., BPMN, DMN, PMML, DRL, etc.) can provide a mapping between the data models used in that engine, and an intermediate data model representation.

In an example, the intermediate data models 130-130N can comprise a common Interface Description Language (IDL) such as Extensible Markup Language (XML) Schema, JavaScript Object Notation (JSON) Schema, OpenAPI, Protocol Buffers, or Thrift, etc. In an example where the intermediate data models 130-130N are in the OpenAPI format, the shared schema could double as a way to export data-type information at the service level, in case the files 118-118N are being deployed as a stand-alone cloud service.

Even within the standardized intermediate representation, the intermediate data models 130-130N can vary due to differences in "shape" of the data model (e.g., the names of fields may not match, the fields could be nested in different sub-structures, etc.). Therefore, the mapper 114 can be provided to generate a map 132 linking pairs of elements to each other across the intermediate data models 130-130N. For example, the map 132 can indicate that the element 126 of the intermediate data model 130 matches the element 126N of the intermediate data model 130N. In an example, the map 132 can be stored in the memory 106 on the computing device 102. In other examples, the map 132 can be stored in the storage device 108 or in the cloud.

To illustrate an example application of how the mapper 114 can determine the map 132 for the elements 126-126N and 128-128N in the intermediate data models 130-130N, consider a case where the file 118 is a BPMN file, and where the file 118N is a DMN. The component 120 includes the reference 122 that calls into the component 120N. The intermediate data model 130, corresponding to the file 118 and component 120, can include a reference to a person with some identifying information in fields while the intermediate data model 130N includes a reference to a Student with other identifying information. This is depicted in FIG. 2, where a table shows matching elements of the intermediate data models 130-130N.

Figure 2:
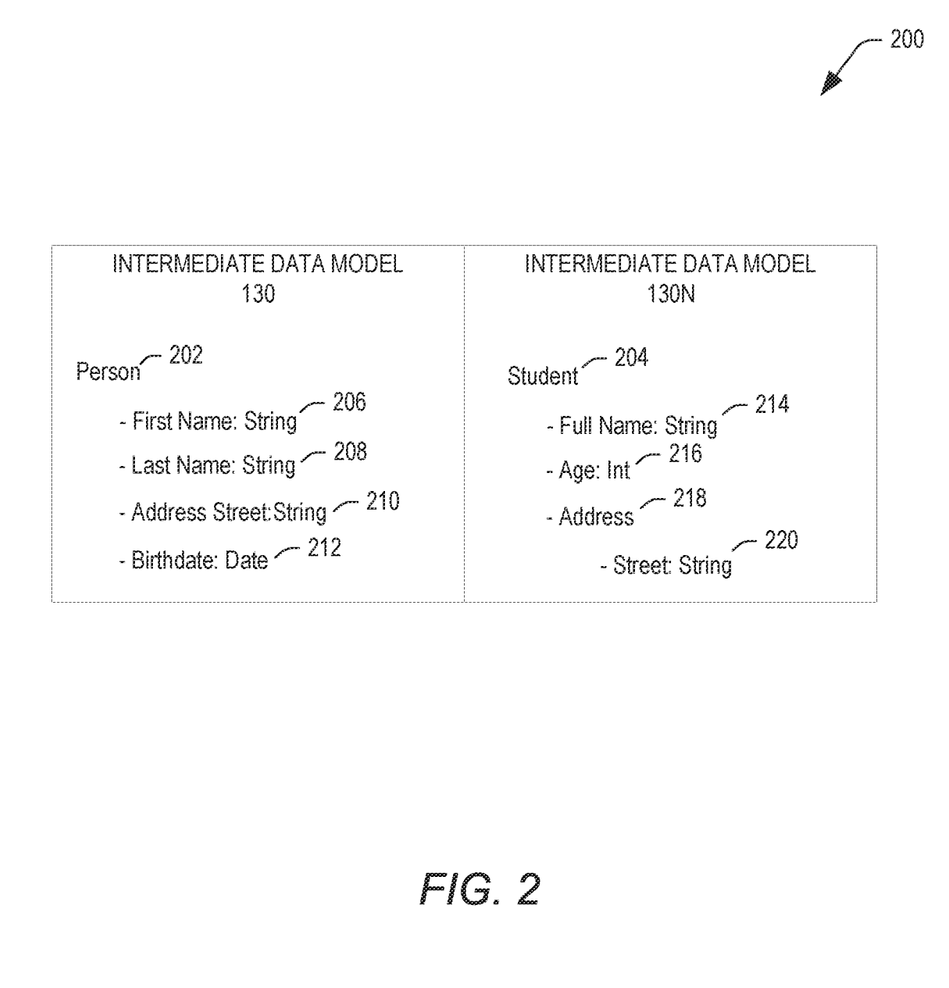
FIG. 2 illustrates a table showing matching elements of intermediate data models in accordance with various aspects of the subject disclosure.

FIG. 2 illustrates a table 200 showing matching elements of intermediate data models 130 and 130N. Each of the intermediate data model 130 and the intermediate data model 130N have objects 202 and 204, where the object 202 in intermediate data model 130 references a person, whereas the object 204 in intermediate data model 130N references a student. Each of the intermediate data model 130-130N comprises groups of elements that may match elements in the other intermediate data model. For example, in FIG. 2, the intermediate data model 130 has elements 206-212, and the intermediate data model 130N has elements 214-220. It is to be appreciated that these elements 206-220 are just exemplary elements and, in this example, are in addition to, or in lieu of, the elements 126-126N and 128-128N depicted in FIG. 1. The mapper 114 can determine that the elements 206 and 208, comprising strings corresponding to the First Name and Last Name in the intermediate data model 130 correspond to the Full Name string in the element 214 in the intermediate data model 130N, as the Full Name comprises both the First Name and Last Name. Likewise, the element 210 matches the element 220, and the element 212 matches the element 216, even though the data in the elements are of a different nature. For example, element 212 is a date corresponding to a birthday, whereas element 216 is an integer corresponding to an age. The map 132 can comprise information relating to the pairs of elements in the different intermediate data models 130-130N as well as information about how to transform the data in one intermediate data model so that it is compatible with the other intermediate data model (e.g., the transformation between age and birthdate with elements 216 and 212 respectively).

Once the map 132 is generated, the code generator 116 can generate code to be executed based on the map 132 of the matching elements. The code generated by the code generator 116 can be executed at a later time by a business process automation platform. The code generator 116 can generate any type of executable code and is not limited to creating executable representations of the original files 118-118N. The code generated by the code generator 116 can include (but not be limited to): representational state transfer (REST) endpoints, adapters for message receivers and producers (e.g., for cloud events), adapters for KNative events (e.g., on a Kogito® business process automation platform), Java mappings for data model representations, automated unit tests for REST endpoints, automated integration tests for the message adapters, generation of REST application programming interface (API) specification/manifests (OpenAPI), automated documentation of the business asset (e.g., entry points of a BPMN, decision services of a DMN, etc.), Kubernetes deployment templates, security policies and run-time validation through keycloak (e.g., in BPMN authorized users to a service/user task), and many other types of code.

Because the data model converter 112, the mapper 114, and the code generator 116 are components of the computing device 102, functionality implemented by the data model converter 112, the mapper 114, and the code generator 116 may be attributed to the computing device 102 generally. Moreover, in examples where the data model converter 112, the mapper 114, and the code generator 116 comprise software instructions that program a processor device (e.g., the processor device 104) to carry out functionality discussed herein, functionality implemented by the data model converter 112, the mapper 114, and the code generator 116 may be attributed herein to the processor device 104 of the computing device 102.

Finally, it is noted that while, for purposes of illustration and simplicity, the examples are illustrated as being implemented by a computing system that comprises a single computing device that, in turn, comprises a single processor device. In practice the examples disclosed herein may be implemented in a computing system that comprises any number of computing devices, each of which may comprise one or more processor devices. Thus, irrespective of the implementation, the examples may be implemented on a computing system that includes one or more computing devices, wherein the one or more computing devices comprise one or more processor devices, and wherein the one or more processor devices are configured to implement functionality disclosed herein.

Figure 3:
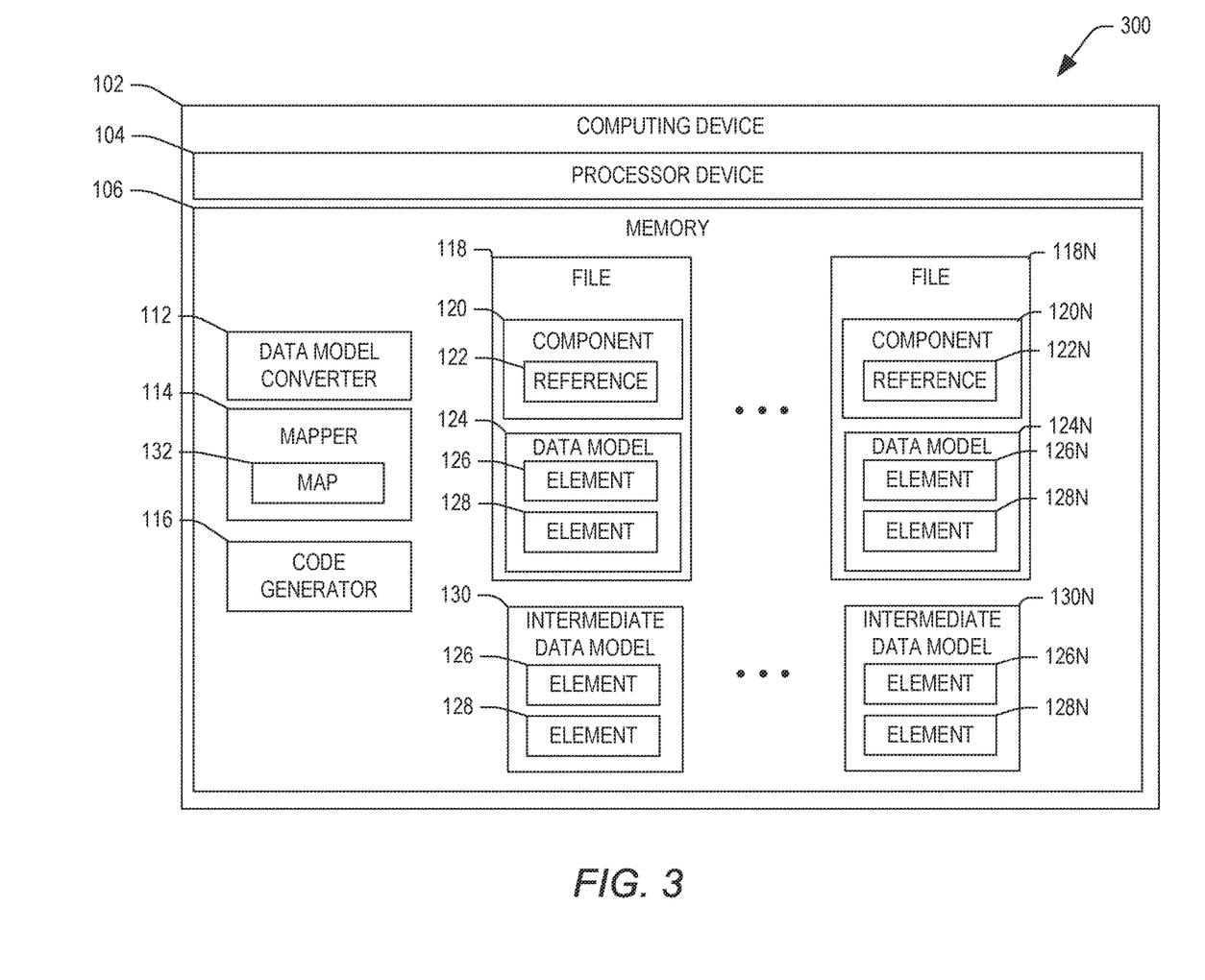
FIG. 3 illustrates a block diagram of an example computing system for mapping data models to facilitate code generation in accordance with various aspects of the subject disclosure.

Turning now to FIG. 3, illustrated is a block diagram of an example computing system 300 for mapping data models to facilitate code generation in accordance with various aspects of the subject disclosure. The computing system 300 in FIG. 3 depicts a different configuration of the computing system 100 shown in FIG. 1. Instead of the storage device 108 being separate from the computing device 102, and communicatively coupled via the network 110, in the example shown in FIG. 2, the files 118-118N can be stored in the memory 106 or in a storage device within the computing device 102.

Figure 4:
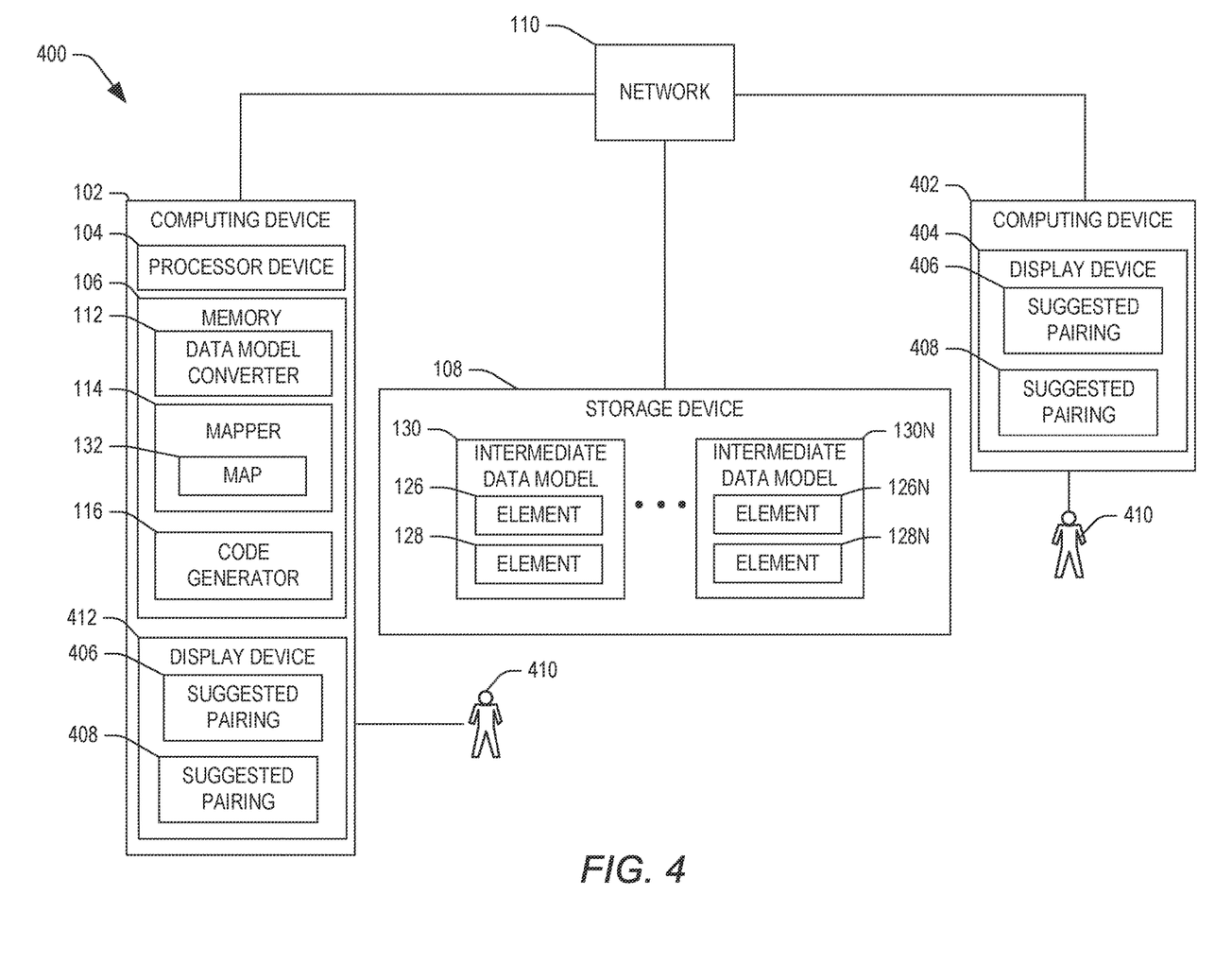
FIG. 4 illustrates a block diagram of an example computing system for mapping data models to facilitate code generation in accordance with various aspects of the subject disclosure.

In FIG. 4, illustrated is a block diagram of an example computing system 400 for mapping data models to facilitate code generation in accordance with various aspects of the subject disclosure.

In an example, the mapper 114 determines whether the elements 126-126N and 128-128N match by generating a match score for each potential pairing of elements (e.g., elements 126 and 126N or elements 128 and 128N, etc.). If the match scores are higher than a first matching threshold, the mapper 114 can generate the map 132 linking the paired elements. If the match scores are below the first matching threshold, but higher than a second matching threshold, the mapper 114 can identify the pairing of elements as a potential match or suggested pairing.

The mapper 114 can transmit information about the potential matches to a computing device 402, via the network 110, that has a display device 404. The display device 404 can display the potential matches as suggested pairings 406 and 408. The display device 404 can also provide contextual information about the suggested pairings 406 and 408 and display a request for feedback to a user 410. The user 410 can select which of the suggested pairings 406 and 408 should be added to the map 132, and the feedback can be transmitted back to computing device 102 and the mapper 114 for the mapper 114 to update the map 132 with the selection from the user 410. In an example, the computing device 102 can include a display device 412 that can display the suggested pairings 406 and 408, and the user 410 can select one of the suggested pairings 406 or 408 on the display device 412.

In an example, the match scores can be based on a similarity of a string associated with the elements. For example, the mapper 114 can determine a Hamming distance between two strings. Hamming distance between strings is the number of positions at which the corresponding symbols in the strings are different. The match score is, thus, inversely proportional to the Hamming distance. If the Hamming distance is below a predetermined Hamming distance, the strings can be considered a matching pair. In other embodiments, other techniques to determine the similarity of the elements can be provided, including a heuristic-based mapping, a type-wise mapping, a telemetry-based mapping, and a historical/statistical mapping.

Figure 5:
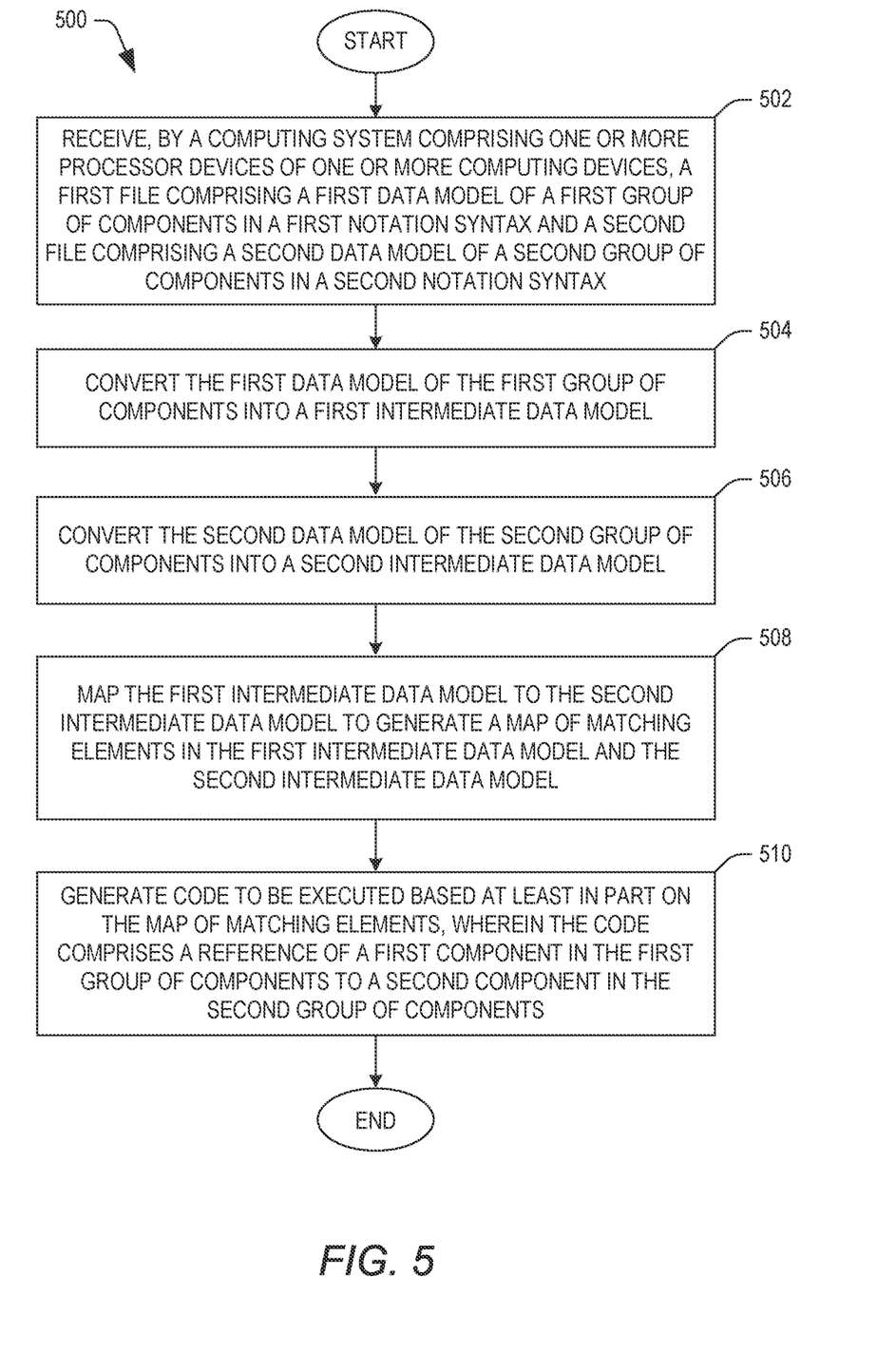
FIG. 5 illustrates a flowchart of an example method for mapping data models to facilitate code generation in accordance with various aspects of the subject disclosure.

FIG. 5 illustrates a process in connection with the aforementioned computing systems 100, 300, and/or 400. FIG. 5 will be discussed in conjunction with FIG. 1. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 5, illustrated is a flowchart of an example method 500 for mapping data models to facilitate code generation in accordance with various aspects of the subject disclosure.

At step 502, the method 500 can include receiving, by a computing system (e.g., the computing device 102) comprising one or more processor devices (e.g., the processor device 104) of one or more computing devices, a first file (e.g., the file 118) comprising a first data model (e.g., the data model 124) of a first group of components (e.g., the component 120) in a first notation syntax (e.g., BPMN syntax) and a second file (e.g., the file 118N) comprising a second data model (e.g., the data model 124N) of a second group of components (e.g., the component 120N) in a second notation syntax (e.g., DMN syntax).

At step 504, the method 500 can include converting (e.g., by the data model converter 112) the first data model 124 of the first group of components 120 into the first intermediate data model 130.

At step 506, the method 500 can include converting (e.g., by the data model converter 112) the second data model 124N of the second group of components 120N into the second intermediate data model 130N.

At step 508, the method 500 can include mapping (e.g., by the mapper 114) the first intermediate data model 130 to the second intermediate data model 130N to generate a map 132 of matching elements (e.g., the elements 126-126N in the first intermediate data model 130 and the second intermediate data model 130N.

At step 510, the method 500 can include generating code (e.g., by the code generator 116) to be executed based at least in part on the map 132 of matching elements 126-126N, wherein the code comprises the reference 122 of a first component in the first group of components 120 to a second component in the second group of components 120N.

Figure 6:
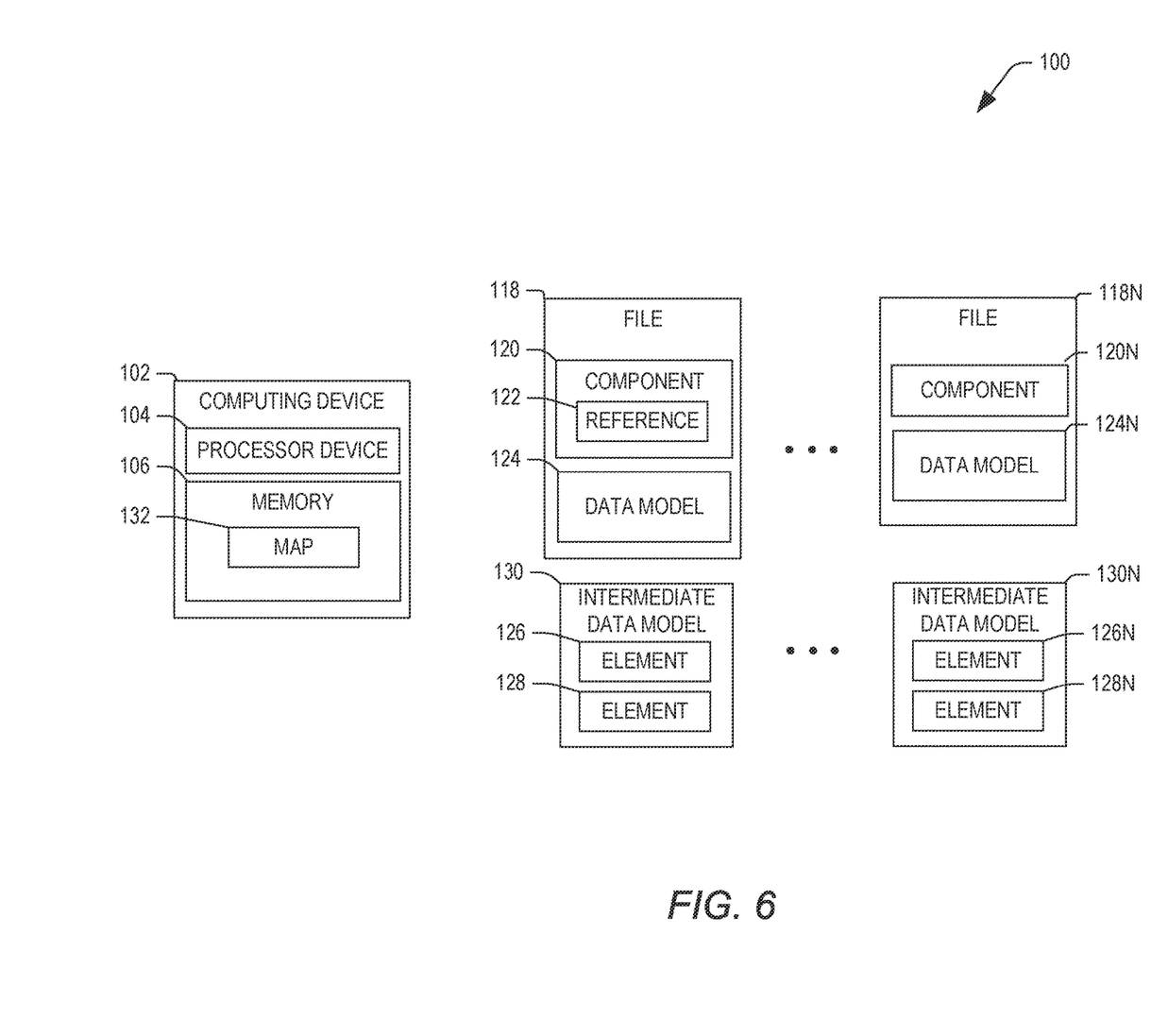
FIG. 6 illustrates a simplified block diagram of the computing system illustrated in FIG. 1 in accordance with various aspects of the subject disclosure.

FIG. 6 is a simplified block diagram of the computing system 100 illustrated in FIG. 1 in accordance with various aspects of the subject disclosure. The computing system 100 includes the computing device 102 that includes the memory 106 coupled to the processor device 104. The processor device 104 is to receive the first file 118 comprising the first data model 124 of a first group of components 120 in a first notation syntax and the second file 118N comprising the second data model 124N of a second group of components 120N in a second notation syntax. The processor device 104 is further to convert the first data model 124 of the first group of components 120 into the first intermediate data model 130. The processor device 104 is further to convert the second data model 124N of the second group of components 120N into the second intermediate data model 130N. The processor device 104 is further to map the first intermediate data model 130 to the second intermediate data model 130N to generate a map 132 of matching elements 126-126N and 128-128N in the first intermediate data model 130 and the second intermediate data model 130N. The processor device 104 is further to generate code to be executed based at least in part on the map 132 of matching elements 126-126N and 128-128N, wherein the code comprises the reference 122 of a first component in the first group of components 120 to a second component in the second group of components 120N.

Figure 7:
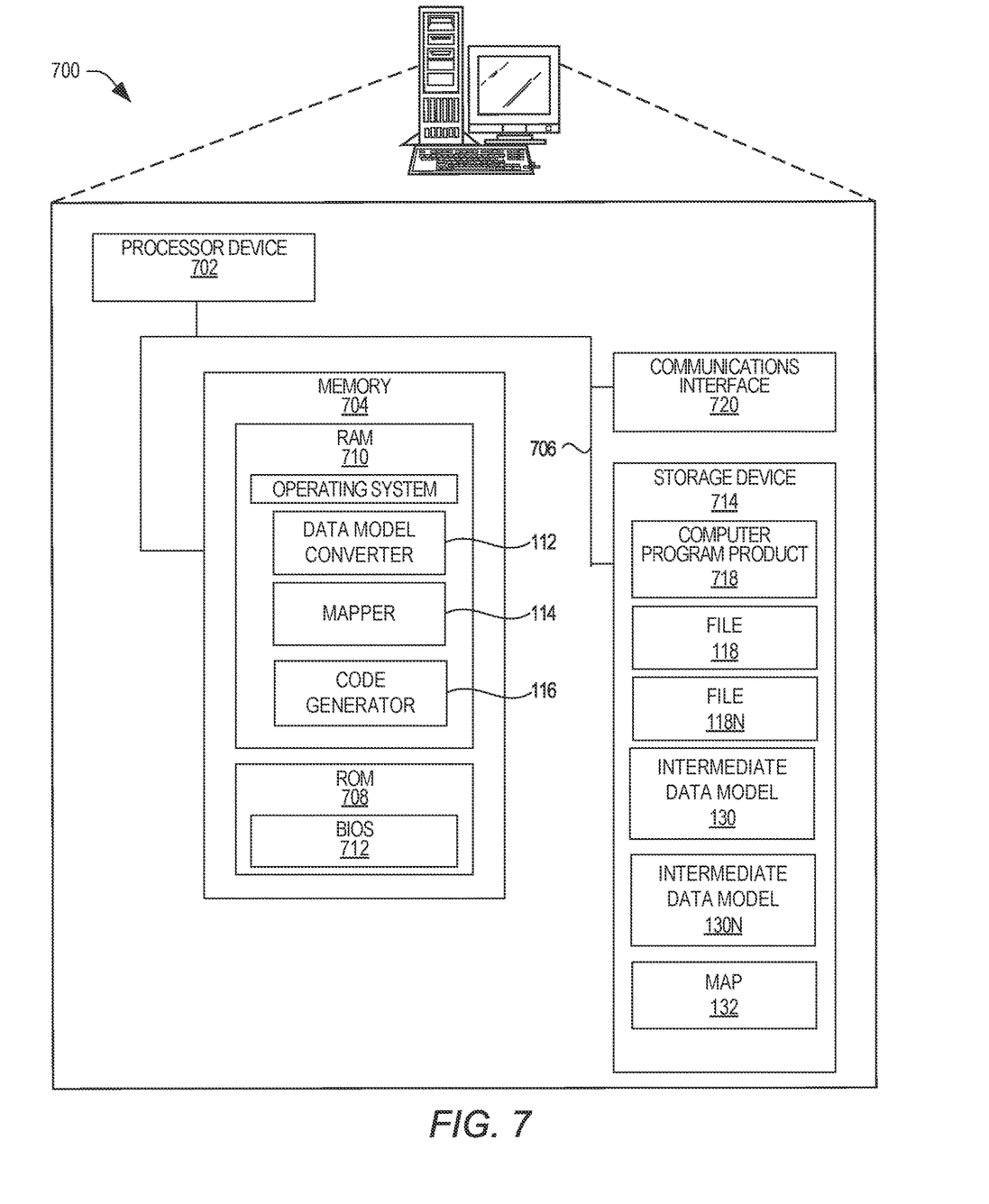
FIG. 7 illustrates an example block diagram of a computer that can be operable to execute processes and methods in accordance with various aspects of the subject disclosure.

FIG. 7 is a block diagram of a computing device 700 suitable for implementing the computing device 102 according to one example. The computing device 700 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 700 includes a processor device 702, a system memory 704, and a system bus 706. The system bus 706 provides an interface for system components including, but not limited to, the system memory 704 and the processor device 702. The processor device 702 can be any commercially available or proprietary processor.

The system bus 706 may be any of several types of bus structures that may further interconnect to a memory bus (with or without a memory controller), a peripheral bus, and/or a local bus using any of a variety of commercially available bus architectures. The system memory 704 may include non-volatile memory 708 (e.g., read-only memory (ROM), erasable programmable read-only memory (EPROM), electrically erasable programmable read-only memory (EEPROM), etc.), and volatile memory 710 (e.g., random-access memory (RAM)). A basic input/output system (BIOS) 712 may be stored in the non-volatile memory 708 and can include the basic routines that help to transfer information between elements within the source computing device 700. The volatile memory 710 may also include a high-speed RAM, such as static RAM, for caching data.

The computing device 700 may further include or be coupled to a non-transitory computer-readable storage medium such as a storage device 714, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 714 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 714 and in the volatile memory 710, including an operating system and one or more components, such as the data model converter 112, the mapper 114, and the code generator 116 if the computing device 700 is implementing the computing device 102. Such components may implement the functionality described herein in whole or in part. It is to be appreciated that the examples can be implemented with various commercially available operating systems or combinations of operating systems.

The files 118-118N, the intermediate data models 130-130N and the map 132 can also be stored in the storage device 714. All or a portion of the examples may be implemented as a computer program product 718 stored on a transitory or non-transitory computer-usable or computer-readable storage medium, such as the storage device 714, which includes complex programming instructions, such as complex computer-readable program code, to cause the processor device 702 to carry out the steps described herein. Thus, the computer-readable program code can comprise software instructions for implementing the functionality of the examples described herein when executed on the processor device 702.

The computing device 700 may also include a communications interface 720 suitable for communicating with a mobile wireless network or other computing devices as appropriate or desired.

Those skilled in the art will recognize improvements and modifications to the preferred examples of the disclosure. All such improvements and modifications are considered within the scope of the concepts disclosed herein and the claims that follow.

What is claimed is:

1. A method comprising:
    receiving, by a computing system comprising one or more processor devices of one or more computing devices, a first file comprising a first data model of a first group of components in a first notation syntax and a second file comprising a second data model of a second group of components in a second notation syntax;
    converting the first data model of the first group of components into a first intermediate data model;
    converting the second data model of the second group of components into a second intermediate data model;
    mapping the first intermediate data model to the second intermediate data model, to generate a map of matching elements in the first intermediate data model and the second intermediate data model, wherein mapping the first intermediate data model to the second intermediate data model comprises:
        determining that a Hamming distance between a first element of the first intermediate data model and a second element of the second intermediate data model is below a predetermined Hamming distance threshold;
        mapping the first element of the first intermediate data model to the second element of the second intermediate data model, wherein the first element of the first intermediate data model comprises a first format associated with the first notation syntax, wherein the second element of the second intermediate data model comprises a second format associated with the second notation syntax different than the first format; and generating code to be executed based at least in part on the map of matching elements, wherein the code comprises a reference of a first component in the first group of components to a second component in the second group of components.

2. The method of claim 1, further comprising:
in response to a third element of the first intermediate data model and a fourth element of the second intermediate data model not satisfying a first matching threshold, determining one or more suggested pairings of elements from the first intermediate data model and the second intermediate data model, wherein the one or more suggested pairings of elements satisfy a second matching threshold.

3. The method of claim 2, further comprising:
transmitting the one or more suggested pairings of elements to a device, wherein the one or more suggested pairings of elements are configured to be displayed on the device.

4. The method of claim 3, further comprising:
receiving, from the device, user feedback comprising a selection of a pairing of elements of the one or more suggested pairings of elements; and
updating the map of matching elements based on the selection of the pairing of elements.

5. The method of claim 1, wherein at least one of the first notation syntax and the second notation syntax are at least one of Decision Modeling and Notation (DMN) syntax, Business Process Model Notation (BPMN) syntax, Predictive Model Markup Language (PMML) syntax, and Drools Rule Language (DRL) syntax.

6. The method of claim 1, wherein the first intermediate data model and the second intermediate data model are data models complying with an Interface Description Language (IDL).

7. The method of claim 6, wherein the IDL is at least one of an XML Schema, a JSON Schema, an OpenAPI, Protocol Buffer, and Thrift.

8. The method of claim 1, wherein mapping the first intermediate data model to the second intermediate data model is based at least in part on one of a heuristic-based mapping, a type-wise mapping, a telemetry-based mapping, and a historical/statistical mapping.

9. The method of claim 1, wherein the code to be executed is based on at least one of the first intermediate data model and the second intermediate data model.

10. A computing system comprising:
one or more computing devices, the one or more computing devices comprising one or more processor devices, the one or more processor devices to:
receive a first file comprising a first data model of a first group of components in a first notation syntax and a second file comprising a second data model of a second group of components in a second notation syntax;
convert the first data model of the first group of components into a first intermediate data model;
convert the second data model of the second group of components into a second intermediate data model;
map the first intermediate data model to the second intermediate data model to generate a map of matching elements in the first intermediate data model and the second intermediate data model, wherein mapping the first intermediate data model to the second intermediate data model comprises:
determining that a Hamming distance between a first element of the first intermediate data model and a second element of the second intermediate data model is below a predetermined Hamming distance threshold; and
mapping the first element of the first intermediate data model to the second element of the second intermediate data model, wherein the first element of the first intermediate data model comprises a first format associated with the first notation syntax, wherein the second element of the second intermediate data model comprises a second format associated with the second notation syntax different than the first format; and
generate code to be executed based at least in part on the map of matching elements, wherein the code comprises a reference of a first component in the first group of components to a second component in the second group of components.

11. The computing system of claim 10, wherein the one or more processor devices further:
determine one or more suggested pairings of elements from the first intermediate data model and the second intermediate data model in response to a third element of the first intermediate data model and a fourth element of the second intermediate data model not satisfying a first matching threshold, wherein the one or more suggested pairings of elements satisfy a second matching threshold.

12. The computing system of claim 11, wherein the one or more processor devices further:
transmit the one or more suggested pairings of elements to a device, wherein the one or more suggested pairings of elements are configured to be displayed on the device.

13. The computing system of claim 12, wherein the one or more processor devices further:
receive, from the device, user feedback comprising a selection of a pairing of elements of the one or more suggested pairings of elements; and
update the map of matching elements based on the selection of the pairing of elements.

14. The computing system of claim 10, wherein mapping the first intermediate data model to the second intermediate data model is based at least in part on one of a heuristic-based mapping, a type-wise mapping, a telemetry-based mapping, and a historical/statistical mapping.

15. The computing system of claim 10, wherein the code to be executed is based on at least one of the first intermediate data model and the second intermediate data model.

16. The computing system of claim 10, wherein at least one of the first notation syntax and the second notation syntax are at least one of Decision Modeling and Notation (DMN) syntax, Business Process Model Notation (BPMN) syntax, Predictive Model Markup Language (PMML) syntax, and Drools Rule Language (DRL) syntax.

17. The computing system of claim 10, wherein the first intermediate data model and the second intermediate data model are data models complying with an Interface Description Language (IDL).

18. A non-transitory computer-readable storage medium that includes executable instructions to cause one or more processor devices of one or more computing devices to:
receive a first file comprising a first data model of a first group of components in a first notation syntax and a second file comprising a second data model of a second group of components in a second notation syntax;

convert the first data model of the first group of components into a first intermediate data model;

convert the second data model of the second group of components into a second intermediate data model;

map the first intermediate data model to the second intermediate data model to generate a map of matching elements in the first intermediate data model and the second intermediate data model, wherein mapping the first intermediate data model to the second intermediate data model comprises:

determining that a Hamming distance between a first element of the first intermediate data model and a second element of the second intermediate data model is below a predetermined Hamming distance threshold; and     mapping the first element of the first intermediate data model to the second element of the second intermediate data model, wherein the first element of the first intermediate data model comprises a first format associated with the first notation syntax, wherein the second element of the second intermediate data model comprises a second format associated with the second notation syntax different than the first format; and generate code to be executed based at least in part on the map of matching elements, wherein the code comprises a reference of a first component in the first group of components to a second component in the second group of components.

* * * * *